US011698452B2

(12) United States Patent  
Bialer et al.

(10) Patent No.: US 11,698,452 B2  
(45) Date of Patent: Jul. 11, 2023

(54) TARGET TRACKING DURING ACCELERATION EVENTS

(71) Applicant: GM GLOBAL TECHNOLOGY OPERATIONS LLC, Detroit, MI (US)

(72) Inventors: Oded Bialer, Petach Tivak (IL); Amnon Jonas, Herzliya (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 350 days.

(21) Appl. No.: 17/118,474

(22) Filed: Dec. 10, 2020

(65) Prior Publication Data

US 2022/0187441 A1     Jun. 16, 2022

(51) Int. Cl.

| | | |
|---|---|---|
| *G01S 13/72* | (2006.01) | |
| *G01S 13/931* | (2020.01) | |
| *G01S 13/86* | (2006.01) | |
| *G01S 13/62* | (2006.01) | |
| *G06V 10/22* | (2022.01) | |
| *G06V 20/58* | (2022.01) | |

(52) U.S. Cl.  
CPC ............ *G01S 13/723* (2013.01); *G01S 13/62* (2013.01); *G01S 13/865* (2013.01); *G01S 13/867* (2013.01); *G01S 13/931* (2013.01); *G06V 10/22* (2022.01); *G06V 20/58* (2022.01); *G01S 2013/9318* (2020.01); *G01S 2013/9319* (2020.01); *G01S 2013/93185* (2020.01)

(58) Field of Classification Search  
CPC ...... G01S 13/723; G01S 13/62; G01S 13/865; G01S 13/867; G01S 13/931; G01S 2013/93185; G01S 2013/9318; G01S 2013/9319; G06V 20/58; G06V 10/22  
See application file for complete search history.

(56) References Cited

U.S. PATENT DOCUMENTS

| | | | |
|---|---|---|---|
| 2019/0049968 A1* | 2/2019 | Dean ........................ | A61G 5/04 |
| 2021/0072346 A1* | 3/2021 | Bogner .................. | G01S 13/584 |
| 2021/0263525 A1* | 8/2021 | Das ........................ | G06N 3/084 |
| 2022/0113397 A1* | 4/2022 | Akamine ................ | G01S 13/86 |

OTHER PUBLICATIONS

R. K. Raney, "Synthetic Aperture Imaging Radar and Moving Targets," in IEEE Transactions on Aerospace and Electronic Systems, vol. AES-7, No. 3, pp. 499-505, May 1971, doi: 10.1109/TAES.1971.310292. (Year: 1971).*

* cited by examiner

*Primary Examiner* — Peter M Bythrow  
*Assistant Examiner* — Nazra Nur Waheed  
(74) *Attorney, Agent, or Firm* — Lorenz & Kopf LLP (57) ABSTRACT

Vehicles and methods for tracking an object and controlling a vehicle based on the tracked object. A Radar-Doppler (RD) map is received from the radar sensing system of the vehicle and relative acceleration of an object with respect to the vehicle is detected based on the RD map so as to provide acceleration data. A current frame of detected object data is received from a sensing system of the vehicle. When the relative acceleration has been detected, a tracking algorithm is adapted to reduce the influence of the predictive motion model or the historical state of the object and the object is tracked using the adapted tracking algorithm so as to provide adapted estimated object data based on the object tracking. One or more vehicle actuators are controlled based on the adapted estimated object data.

16 Claims, 5 Drawing Sheets

TARGET TRACKING DURING ACCELERATION EVENTS

INTRODUCTION

The technical field generally relates to vehicles, and more particularly relates to methods and systems for more accurately tracking a target object during acceleration events.

Vehicles utilize object tracking algorithms in a variety of vehicle control applications including advanced driver assistance systems (ADAS) and autonomous driving tasks as two of many possible examples. Such vehicle control applications may require objects to be detected and tracked using a sensing system in order to control emergency braking, collision avoidance, path planning, and other automatic vehicle control functions.

Some vehicles utilize camera vision systems, radar systems and/or lidar systems for object detection and tracking. Object tracking utilizes a tracking algorithm, which may rely on a motion model of the target vehicle. Some motion models may not account well for sudden anomalies in the target vehicle motion such as sudden breaking, acceleration or sharp turning. That is, the object information output from the tracker may not match the true object information, e.g. as a result of latency introduced by the tracking algorithm. As a result, the tracker may have large errors during an acceleration event or may even lose lock on targets. This can be troublesome as it is particularly during object acceleration events that accurate object position and velocity information is used for appropriate automated control of the vehicle.

Accordingly, it is desirable to reduce errors in object position estimation (and other state data) during acceleration events and to reduce probability of misdetection during motion anomalies (e.g. acceleration events). In addition, it is desirable to enhance automated vehicle control applications using more accurate object tracking data without requiring significant additional hardware expenditure. Furthermore, other desirable features and characteristics of the present invention will become apparent from the subsequent detailed description and the appended claims, taken in conjunction with the accompanying drawings and the foregoing technical field and background.

SUMMARY

In a first aspect, a method of object tracking and vehicle control is provided. The method includes, via a processor: receiving the Radar-Doppler, RD, map from a radar sensing system of a vehicle, detecting relative acceleration of an object with respect to the vehicle based on the RD map and providing acceleration data based thereon and receiving a current frame of detected object data from a sensing system of the vehicle. When the relative acceleration has not been detected, the object is tracked based on the current frame of detected object data, a predictive motion model and a historical state of the object using a tracking algorithm and estimated object data is provided based on the object tracking. When the relative acceleration has been detected, the tracking algorithm is adapted to reduce the influence of the predictive motion model and the historical state of the object and the object is tracked using the adapted tracking algorithm and adapted estimated object data is provided based on the object tracking. A vehicle feature is controlled based on the adapted estimated object data or the estimated object data.

In embodiments, detection of relative acceleration of an object with respect to the vehicle is performed using a neural network. The neural network may be a deep neural network including a convolutional neural network, fully connected layers and a logistic regression operation. The deep neural network is trained to classify RD maps that have been captured when the vehicle is moving at a constant velocity and to classify RD maps that have been captured when the vehicle is accelerating.

In embodiments, the acceleration data includes a binary value indicating an accelerating state and a non-accelerating state, a plurality of output levels corresponding to different states of acceleration, or a continuously variable output representing degree of acceleration.

In embodiments, the acceleration data is determined based on a detection of blurriness of the RD map.

In embodiments, receiving a current frame of detected object data from a sensing system of the vehicle includes receiving the current frame of detected object data from the radar system.

In embodiments, receiving a current frame of detected object data from a sensing system of the vehicle includes receiving the current frame of detected object data from a lidar system or a camera vision system.

In embodiments, the tracking algorithm includes a Kalman filter.

In embodiments, adapting the tracking algorithm includes replacing the historical state of the object with the current frame of detected object data, adjusting a covariance matrix, and/or adjusting parameters of the predictive motion model.

In embodiments, the vehicle features include a steering command, a braking command and a propulsion command.

In another aspect, a vehicle is provided. The vehicle includes a radar sensing system, one or more vehicle actuators including steering, braking and propulsion actuators; and a processor in operable communication with the radar sensing system and the vehicle actuators. The processor executes program instructions to execute steps as outlined in the following. A Radar-Doppler, RD, map is received from the radar sensing system of the vehicle. Relative acceleration of an object with respect to the vehicle is detected based on the RD map and acceleration data is provided based on the relative acceleration detecting. A current frame of detected object data is received from a sensing system of the vehicle. When the relative acceleration has not been detected, the object is tracked based on the current frame of detected object data, a predictive motion model and a historical state of the object using a tracking algorithm and estimated object data is provided based on the object tracking. When the relative acceleration has been detected, the tracking algorithm is adapted to reduce the influence of the predictive motion model and/or the historical state of the object, the object is tracked using the adapted tracking algorithm and adapted estimated object data is provided based on the object tracking. The one or more vehicle actuators are controlled based on the adapted estimated object data or the estimated object data.

In embodiments, detection of the relative acceleration of an object with respect to the vehicle is performed using a neural network. The neural network is a deep neural network including a convolutional neural network, fully connected layers and a logistic regression operation. The deep neural network is trained to classify RD maps that have been captured when the vehicle is moving at a constant velocity and to classify RD maps that have been captured when the vehicle is accelerating.

In embodiments, the acceleration data includes: a binary value indicating an accelerating state and a non-accelerating state, a plurality of output levels corresponding to different states of acceleration, or a continuously variable output representing degree of acceleration.

In embodiments, the acceleration data is determined based on a measure of blurriness of the RD map.

In embodiments, receiving a current frame of detected object data from a sensing system of the vehicle includes receiving the current frame of detected object data from the radar system.

In embodiments, receiving a current frame of detected object data from a sensing system of the vehicle includes receiving the current frame of detected object data from a lidar system or a camera vision system.

In embodiments, the tracking algorithm includes a Kalman filter.

In embodiments, adapting the tracking algorithm includes replacing the historical state of the object with the current frame of detected object data, adjusting a covariance matrix, and/or adjusting parameters of the predictive motion model.

In embodiments, the detected object data is produced based on range doppler, beam forming and reflection points detection processes on raw radar data from a radar device of the radar system. The RD map is produced by the range doppler process on the raw radar data.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to an application specific integrated circuit (ASIC), an electronic circuit, a processor (shared, dedicated, or group) and memory that executes one or more software or firmware programs, a combinational logic circuit, and/or other suitable components that provide the described functionality.

Figure 1:
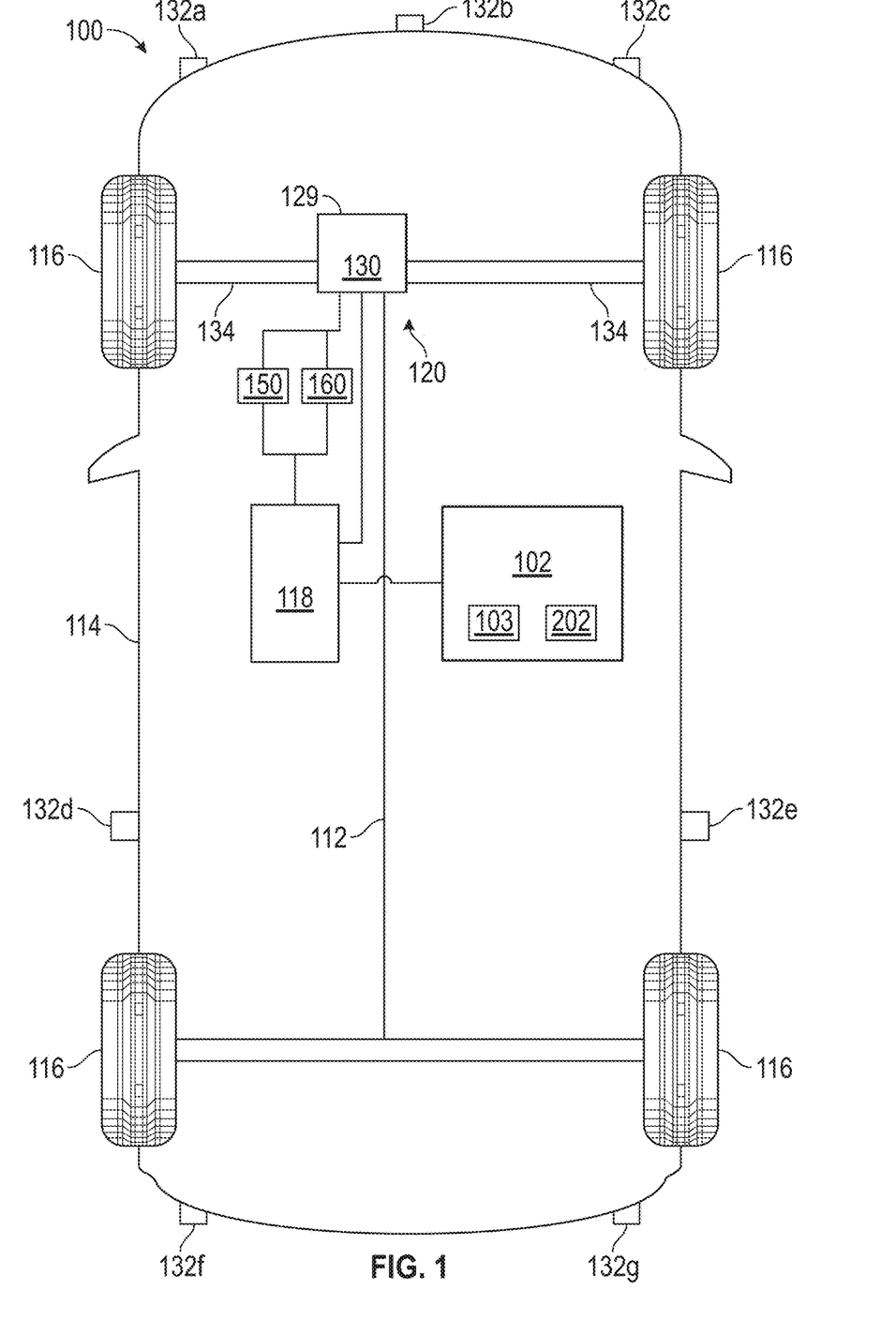
FIG. 1 is a functional block diagram of a vehicle that includes a radar system and a control system, in accordance with an exemplary embodiment.

FIG. 1 illustrates a vehicle 100, or automobile, according to an exemplary embodiment. As described in greater detail further below, the vehicle 100 includes a control system 102 for utilizing radar data to detect whether an acceleration event is occurring. Such an acceleration event includes a relative acceleration between the vehicle 100 and an object. During such acceleration events, the acceleration typically manifests as more blurred radar doppler (RD) maps than when the RD maps are captured during constant relative velocity conditions. Thus, when an acceleration event is detected, a tracking algorithm of the control system 102 and that tracks the object is adapted so as to place more weight on a current frame of object sensing data than on historical object sensing data and/or to place less weight on a predictive vehicle motion model. In this way, when there is acceleration event is detected, the tracking algorithm provides an object position estimation that greater reflects instantaneous sensing and that is less influenced by historical and predictive model factors.

As depicted in FIG. 1, the vehicle 100 includes, in addition to the above-referenced control system 102, a chassis 112, a body 114, four wheels 116, an electronic control system 118, a steering system 150, and a braking system 160. The body 114 is arranged on the chassis 112 and substantially encloses the other components of the vehicle 100. The body 114 and the chassis 112 may jointly form a frame. The wheels 116 are each rotationally coupled to the chassis 112 near a respective corner of the body 114. In various embodiments the vehicle 100 may differ from that depicted in FIG. 1. For example, in certain embodiments the number of wheels 116 may vary. By way of additional example, in various embodiments the vehicle 100 may not have a steering system, and for example may be steered by differential braking, among various other possible differences.

In the exemplary embodiment illustrated in FIG. 1, the vehicle 100 includes an actuator assembly 120. The actuator assembly 120 includes at least one propulsion system 129 mounted on the chassis 112 that drives the wheels 116. The actuator assembly further includes a steering system 150 and a braking system 160 and associated steering and braking actuators. In the depicted embodiment, the actuator assembly 120 includes an engine 130. In one embodiment, the engine 130 comprises a combustion engine. In other embodiments, the actuator assembly 120 may include one or more other types of engines and/or motors, such as an electric motor/generator, instead of or in addition to the combustion engine.

Still referring to FIG. 1, the engine 130 is coupled to at least some of the wheels 116 through one or more drive shafts 134. In some embodiments, the engine 130 is mechanically coupled to the transmission. In other embodiments, the engine 130 may instead be coupled to a generator used to power an electric motor that is mechanically coupled to the transmission. In certain other embodiments (e.g. electrical vehicles), an engine and/or transmission may not be necessary.

The steering system 150 is mounted on the chassis 112, and controls steering of the wheels 116. The steering system 150 includes a steering wheel and a steering column (not depicted). The steering wheel receives inputs from a driver of the vehicle 100. The steering column results in desired steering angles for the wheels 116 via the drive shafts 134 based on the inputs from the driver. Similar to the discussion above regarding possible variations for the vehicle 100, in certain embodiments the vehicle 100 may not include a steering wheel and/or steering column. In addition, in certain embodiments, an autonomous vehicle may utilize steering commands that are generated by a computer, with no involvement from the driver.

The braking system 160 is mounted on the chassis 112, and provides braking for the vehicle 100. The braking system 160 receives inputs from the driver via a brake pedal (not depicted), and provides appropriate braking via brake units (also not depicted). The driver also provides inputs via an accelerator pedal (not depicted) as to a desired speed or acceleration of the vehicle, as well as various other inputs for various vehicle devices and/or systems, such as one or more vehicle radios, other entertainment systems, environmental control systems, lighting units, navigation systems, and the like (also not depicted). Similar to the discussion above regarding possible variations for the vehicle 100, in certain embodiments steering, braking, and/or acceleration can be commanded by a computer instead of by a driver (in one such embodiment, a computer of the vehicle may use input from the radar system to steer, brake, and/or accelerate the vehicle).

In the embodiment of FIG. 1, the vehicle 100 includes a plurality of radar devices 132a to 132g mounted to the body 114. The radar devices (radars) 132a to 132g include forward looking radar devices 132a to 132c, side looking radar devices 132d, 132e and/or rearward looking radar devices 132f, 132g. The various radar devices 132a to 132g may be provided as part of a park assist system, a rear collision warning system, a cross traffic alerts system, an emergency braking system, a pedestrian detection system, a forward collision avoidance system, and/or blind spot detection system, among other possible systems utilizing radar data as in input for various vehicle outputs. Although seven radar devices 132a to 132g are illustrated in FIG. 1, less or more radar devices may be provided. The radar devices 132a to 132g may be short, medium or long range radar devices. The radar devices 132a to 132g, after pre-processing of raw radar data, each produce a Range-Doppler-Beam (RDB) map, as described further herein below. The forward looking radar devices 132a to 132c, in particular, are utilized to provide an RD map for detection of acceleration of an object and for tracking the object, as described further below.

The control system 102 is mounted on the chassis 112. The control system 102 provides for object tracking using a tracking algorithm and the tracking algorithm is adapted depending on whether the object is detected to be accelerating. The control system 102 implements a method for detecting motion anomalies (e.g. acceleration) from the range Doppler spectrum using a Deep Neural Network (DNN), and an object tracking algorithm that adapts according to the anomaly detection state. The object tracking algorithm may be based on other sensor modalities than radar such as camera vision and lidar. The control system 102, in one example, provides these functions in accordance with the method 500 described further below in connection with FIG. 5 and the associated data transformations of FIG. 3.

Figure 2:
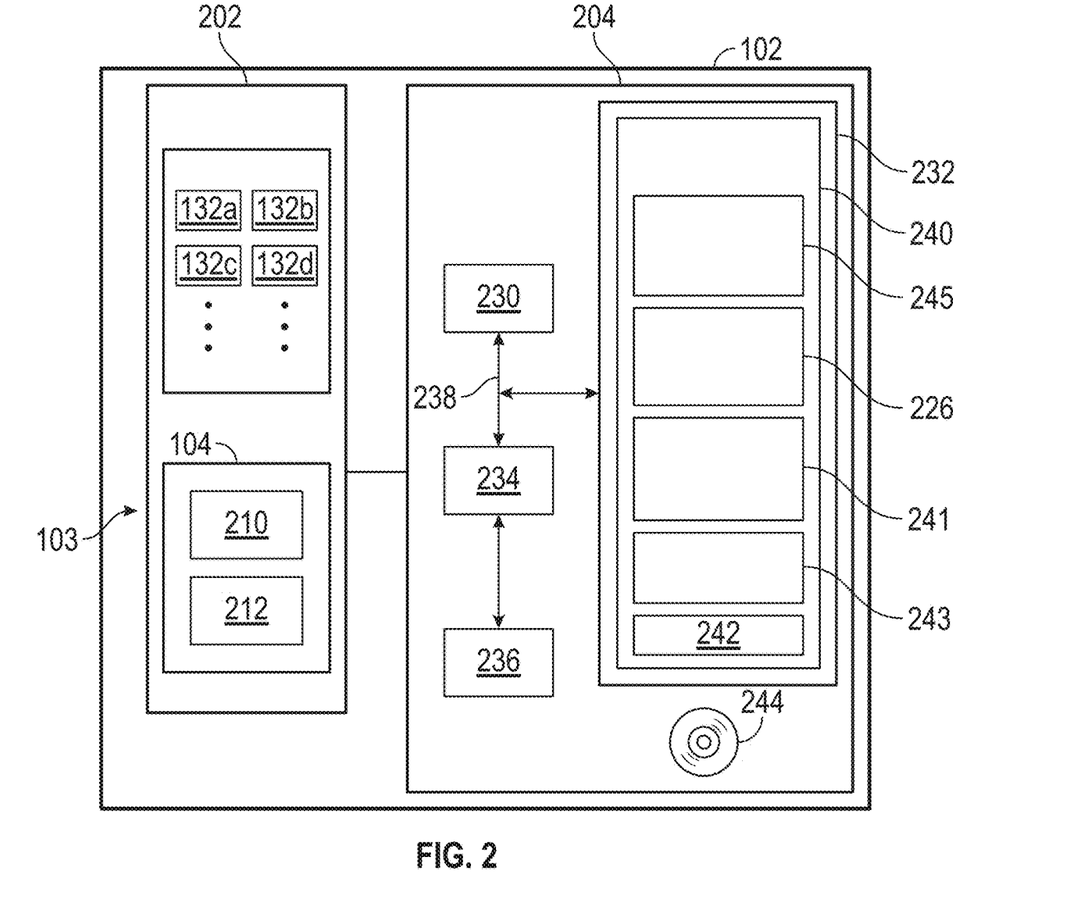
FIG. 2 is a functional block diagram of the control system of the vehicle of FIG. 1, in accordance with an exemplary embodiment.

The control system 102 is depicted to include a radar system 202 in FIG. 2.

However, it will be appreciated that, in certain embodiments, these features may comprise two or more systems. In addition, in various embodiments the control system 102 may comprise all or part of, and/or may be coupled to, various other vehicle devices and systems, such as, among others, the actuator assembly 120, and/or the electronic control system 118.

With reference to FIG. 2, a functional block diagram is provided for the control system 102 of FIG. 1, in accordance with an exemplary embodiment. As depicted in FIG. 2, the control system 102 includes the radar system 202 and a controller 204. The radar system 202 is included as part of the vision system 103, which may include one or more additional sensors 104. In the depicted embodiment, the sensors 104 include one or more cameras 210 (as part of a camera vision system) and one or more light detection and ranging (LIDAR) systems 212. The camera(s) 210, LIDAR system(s) 212 and radar system 202 obtain respective sensor information identifying objects on or near a road in which the vehicle 100 is travelling, such as moving or stationary vehicles on or alongside the road, pedestrians, bicyclists, animals, buildings, trees, guard rails, medians, and/or other objects on or alongside the road.

Also as depicted in FIG. 2, the radar system 202 includes the plurality of radar devices 132a to 132g. Each radar device 132a to 132g includes, in one embodiment, a transmitter (or a transmitter antenna), a receiver (or a receiver antenna) and is coupled to a pre-processing module 226. In another embodiment, a common pre-processing module 226 may be provided. The transmitter transmits radar signals in the form of time separated, frequency modulated chirps. After the transmitted radar signals contact one or more objects on or near a road on which the vehicle 100 is located (either stationary or travelling) and is reflected/redirected toward the radar system 202, the redirected radar signals are received by the receiver of the respective radar device 132a to 132g.

As depicted in FIG. 2, the controller 204 is coupled to the radar system 202 and the sensors 104 (which are part of an additional sensing system). Similar to the discussion above, in certain embodiments the controller 204 may be disposed in whole or in part within or as part of the radar system 202. In addition, in certain embodiments, the controller 204 is also coupled to one or more other vehicle systems (such as the electronic control system 118 of FIG. 1). The controller 204 receives the information sensed or determined from the radar system 202 and the sensors 104. In one embodiment, the controller 204 receives raw radar data from the radar system 202, pre-processes the raw radar data in a pre-processing module 226 of the controller to provide one or more RD maps. The controller 204 detects relative object acceleration using a trained neural network classifier based on the RD maps. A tacking algorithm is adapted when relative object acceleration has been detected so as to be more biased towards a current frame of detected object data from the vision system 103. The controller 204 generally performs these functions in accordance with the method 500 of FIG. 5 and the data flow diagram of FIG. 3.

As depicted in FIG. 2, the controller 204 comprises a computer system. In certain embodiments, the controller 204 may also include one or more of the radar system 202, sensor(s) 104, one or more other systems, and/or components thereof. In addition, it will be appreciated that the controller 204 may otherwise differ from the embodiment depicted in FIG. 2. For example, the controller 204 may be coupled to or may otherwise utilize one or more remote computer systems and/or other control systems, such as the electronic control system 118 of FIG. 1.

In the depicted embodiment, the computer system of the controller 204 includes a processor 230, a memory 232, an interface 234, a storage device 236, and a bus 238. The processor 230 performs the computation and control functions of the controller 204, and may comprise any type of processor or multiple processors, single integrated circuits such as a microprocessor, or any suitable number of integrated circuit devices and/or circuit boards working in cooperation to accomplish the functions of a processing unit. During operation, the processor 230 executes one or more programs 240 contained within the memory 232 and, as such, controls the general operation of the controller 204 and the computer system of the controller 204, generally in executing the processes described herein, such as the method 500 described further below in connection with FIG. 5 and the data flow processes of FIG. 3. The one or more programs 240 include a pre-processing module 226, an acceleration detection module 241, a tracker module 243 and a tracker update module 245 for performing steps of method 500 described in detail below.

The processor 230 is capable of executing one or more programs (i.e., running software) to perform various tasks encoded in the program(s), particularly the pre-processing, the acceleration detection, the tracker and the tracker update modules 226, 241, 243, 245. The processor 230 may be a microprocessor, microcontroller, application specific integrated circuit (ASIC) or other suitable device as realized by those skilled in the art.

The memory 232 can be any type of suitable memory. This would include the various types of dynamic random access memory (DRAM) such as SDRAM, the various types of static RAM (SRAM), and the various types of non-volatile memory (PROM, EPROM, and flash). In certain examples, the memory 232 is located on and/or co-located on the same computer chip as the processor 230. In the depicted embodiment, the memory 232 stores the above-referenced program 240 along with one or more stored values 242 for use in making the determinations.

The bus 238 serves to transmit programs, data, status and other information or signals between the various components of the computer system of the controller 204. The interface 234 allows communication to the computer system of the controller 204, for example from a system driver and/or another computer system, and can be implemented using any suitable method and apparatus. The interface 234 can include one or more network interfaces to communicate with other systems or components. The interface 234 may also include one or more network interfaces to communicate with technicians, and/or one or more storage interfaces to connect to storage apparatuses, such as the storage device 236.

The storage device 236 can be any suitable type of storage apparatus, including direct access storage devices such as hard disk drives, flash systems, floppy disk drives and optical disk drives. In one exemplary embodiment, the storage device 236 comprises a program product from which memory 232 can receive a program 240 (including computer modules 226, 241, 243 and 245) that executes one or more embodiments of one or more processes of the present disclosure, such as the steps of the method 500 (and any sub-processes thereof). In another exemplary embodiment, the program product may be directly stored in and/or otherwise accessed by the memory 232 and/or a disk (e.g., disk 244), such as that referenced below.

The bus 238 can be any suitable physical or logical means of connecting computer systems and components. This includes, but is not limited to, direct hard-wired connections, fiber optics, infrared and wireless bus technologies. During operation, the program 240 is stored in the memory 232 and executed by the processor 230.

It will be appreciated that while this exemplary embodiment is described in the context of a fully functioning computer system, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium bearing the program and containing computer instructions stored therein for causing a computer processor (such as the processor 230) to perform and execute the program. Such a program product may take a variety of forms, and the present disclosure applies equally regardless of the particular type of computer-readable signal bearing media used to carry out the distribution. Examples of signal bearing media include: recordable media such as floppy disks, hard drives, memory cards and optical disks, and transmission media such as digital and analog communication links. It will similarly be appreciated that the computer system of the controller 204 may also otherwise differ from the embodiment depicted in FIG. 2, for example in that the computer system of the controller 204 may be coupled to or may otherwise utilize one or more remote computer systems and/or other control systems.

Figure 3:
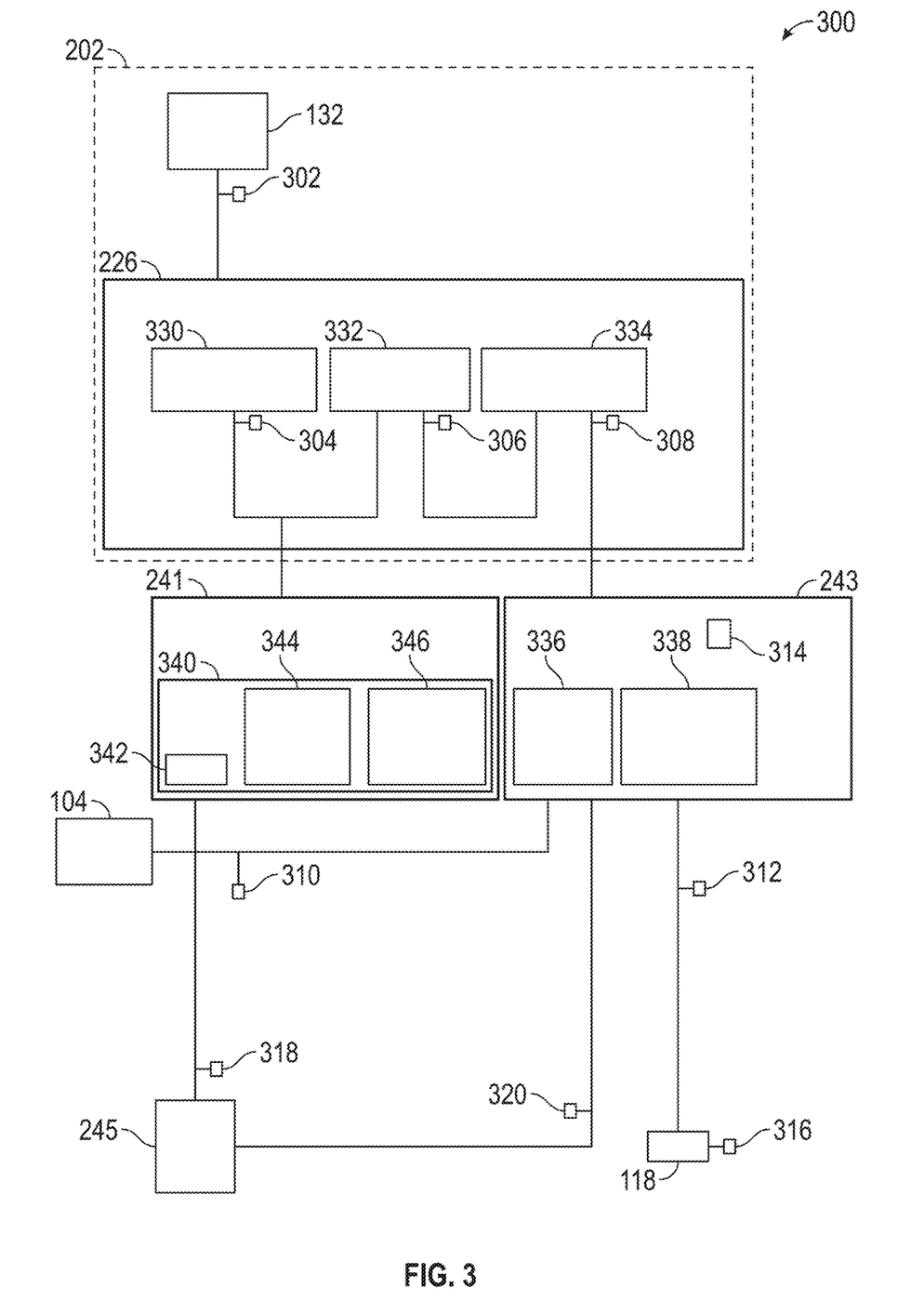
FIG. 3 is a data flow diagram for providing estimated object data for a tracked object, which is performed by the vehicle of FIG. 1 and the control system of FIG. 2, in accordance with an exemplary embodiment.

With additional reference to the data flow diagram 300 of FIG. 3, the or each radar device 132 provides raw radar data 302. In one embodiment, there are 8 channels corresponding to a respective antenna associated with each radar device 132. Each channel provides respective raw radar data 302 for each time frame. Fewer or more channels may be included in each radar device 132. The raw radar data 302 (or radar signals) may be provided in the form of I/Q data. Each frame of raw data may be collected every 20 to 50 milliseconds, for example.

The raw radar data 302 is received by the pre-processing module 226, which executes range-doppler (RD) processing 330, beamforming 332 and reflection points detection 334. The pre-processing module 226 outputs RD maps 304 and provides detected object data 308 representing objects detected by the radar system 202. The RD processing 330 provides a two-dimensional (2D) matrix of range and energy (Doppler) bins with each cell representing an intensity value for a subrange of range and energy readings. In one embodiment, the raw radar data 302 includes eight channels of raw radar data 302, which means that the range doppler processing 330 will provide eight RD maps 304. RD processing 330 per frame assumes a constant relative velocity of the vehicle and any objects over the course of the short frame time of radar capture, which may be 20 to 50 milliseconds as described above. In embodiments, the RD processing 330 includes a Discrete Fourier Transform (DFT) process that assumes a constant velocity per frame. The RD processing 330 assumes a linear phase variation, which is true for constant velocity but is not true during significant acceleration events. When the vehicle has the constant velocity during the radar frame time, then the constant velocity assumption is correct and the RD processing 330 is matched to the phase variation. However, when the vehicle motion is not constant velocity (e.g. during acceleration/deceleration/turning), then the assumption of constant velocity relied upon by the range doppler processing 330 is not correct, the phase variation is not linear and the RD processing 330 has a mismatch.

Figure 4:
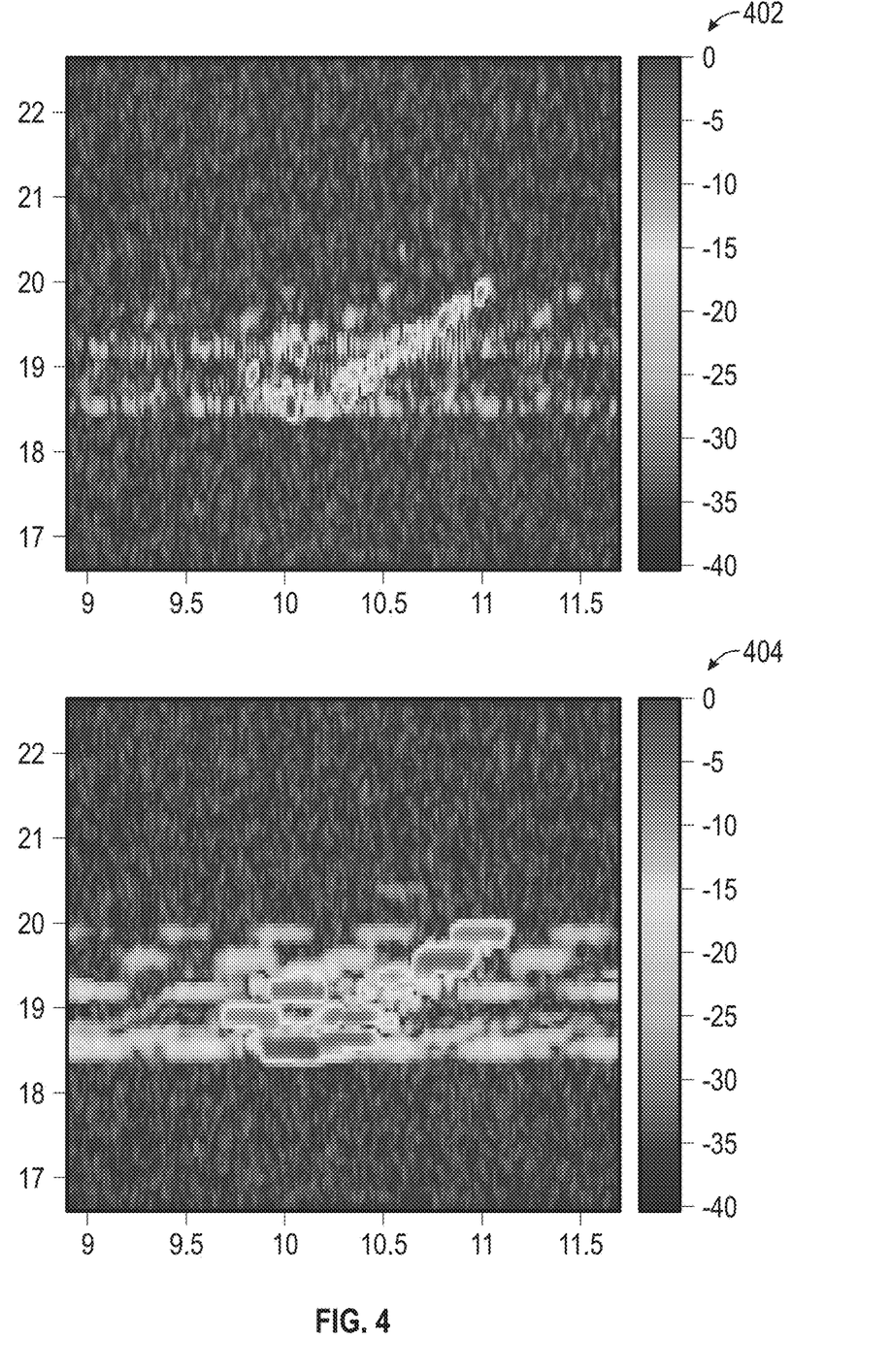
FIG. 4 shows exemplary RD maps used to detect object acceleration, in accordance with an exemplary embodiment.

Referring briefly to FIG. 4, it can be seen that a relatively sharp RD map 402 is produced by RD processing 330 during constant relative velocity of the vehicle and objects captured in the raw radar data, whereas a relatively blurred or unfocused RD map 404 is produced during relative acceleration events (which includes positive relative acceleration, deceleration and turning). As will be further described, the present disclosure provides for detecting a motion anomaly from the RD maps 304 using a DNN that is trained to classify different levels of blurriness in the RD maps 304 to quickly detect acceleration events. Tracking history is reset and/or a tracking model is updated when the motion anomaly is detected.

Continuing to refer to FIG. 3, the RD maps 304 are output to the acceleration detection module 241, which is described further below, and to the beamforming process 332. Beamforming 332 consolidates the RD maps 304 from multiple channels and adds an angular dimension to the data. That is, beamforming 332 results in eight (for example) channels of RD maps 304 for the current frame being transformed into a single three or four dimensional matrix including range and doppler information and also azimuthal and/or elevation angular information such that an angular direction of an object, the distance to the object and the velocity of the object are defined. The beamforming process 332 outputs an RDB map 306 to the reflection points detection processing 334. The reflection points detection processing 334 identifies objects in the RDB map 306 based on intensity values being greater than a threshold to distinguish regions in which an object or target is present or absent. The resulting detected object data 308 is passed to the tracker module 243 for identifying and tracking each object.

In embodiments, the tracker module 243 tracks an object and reduces error in the position estimation error by essentially averaging the instantaneous position estimation and incorporating a prediction of the position based on history of object positions (embodied by a historical object state 314) and a predictive motion model 336. The present disclosure recognizes that the predictive motion model 336 is desirably different for normal driving (e.g. during constant relative velocity between objects and the vehicle 100) and anomaly driving (e.g. during relative lateral and/or longitudinal acceleration between one or more objects and the vehicle 100) in order to reduce latency inherent in the output of object position by the tracker module 243 during acceleration events. Normal driving is the most common scenario, which is why conventional object tracking systems are designed based on an assumption of normal driving motion. However, if the relative acceleration event can be detected early enough, the tracker module 243 can be adapted so as to rely less heavily on the historical object state 314 and the predictive motion model 336 than during constant relative velocity conditions, which will make the tracker more accurate with respect to the ground truth. The present disclosure allows near instant detection (e.g. on a frame by frame basis) of such an acceleration event by analyzing, using a neural network, the RD maps 304 for blurriness, which is indicative of acceleration of all relevant kinds, as has been described above with respect to FIG. 4. It should be appreciated that the tracker module 243 may operate based on detected object data 308 from the radar system 202 but may additionally or alternatively operate based on other detected object data from other sensing modalities as described with respect to the additional sensors 104. For example, the tracker module 243 may track objects detected by the lidar system 212 and/or by the camera(s) 210. The tracking principles described further below are applicable irrespective of the sensing modality and the acceleration event detection can be performed based on RD maps 304 even if the object tracking is performed based on other detected object data 310.

The acceleration detection module 241 receives the RD maps 304 from the radar system 202 and performs acceleration detection based thereon. In one embodiment, the acceleration detection module 241 processes the RD maps 304 through a DNN 340 to determine acceleration data 318 indicative of a level of relative acceleration between the vehicle 100 and any object in the RD maps 304. In one embodiment, the RD maps 304 from all eight (for example) channels are processed by the DNN in parallel on a per frame basis. The acceleration data 318 may be a binary output representative of acceleration and constant velocity conditions, a multiple (e.g. greater than three) level output representative of different levels of acceleration from constant velocity to a highest designated level of acceleration and a continuous acceleration measure may be output representative of an acceleration reading. Likewise, the tracker module 243 may be adapted in a binary way, adaptive to multiple different levels or be continuously adaptive depending on the type of output from the acceleration detection module 241. The acceleration detection module 241 determines the acceleration data 318 based on a measure of blurriness of the RD maps 304. In embodiments, the DNN 340 has been trained to classify blurriness of RD maps 304 using labelled training RD maps. The training RD maps can be simulated using a random phase jitter function on raw radar data or the training RD maps can be taken from radar systems 202 during operation of a vehicle. In one embodiment, the DNN 340 includes a Convolutional Neural Network (CNN) 342 with decimation, fully connected layers 344 and a logistic regression or classification layer 346. The CNN and the fully connected layers are trained based on a large set of labelled examples of RD maps 304 as part of a supervised training process.

In embodiments, the tracker update module 245 is responsive to the acceleration data 318 to output tracker adaptation data 320 describing adaptations to be made to the tracker module 243, specifically to the tracking algorithm. The tracker adaptation data 320 may include a command to replace the historical object state 314 with the current frame of object state represented by the detected object data 308, to adapt a covariance matrix of the tracking algorithm and/or to adapt parameters of the predictive motion model. In this way, the estimated object data 312 is more influenced by the current frame of detected object data 308 than predictive or historical terms when acceleration has been detected as compared to the case when acceleration has not been detected. In some embodiments, the acceleration data 318 provides multiple levels of acceleration or a continuous measure of acceleration and the tracking algorithm is proportionally adapted based on the quantitative measure included in the acceleration data 318.

One example of a tracking algorithm implemented by the tracker module 243 is a Kalman filter. The Kalman filter aims to solve the current state parameter vector for each object, d, at time n, which is defined by:

$$d_n = [x_n, y_n, v_x, v_y]^T \qquad \text{(equation 1)}$$

$x_n$ and $y_n$ represent position coordinates for a tracked object and $v_x$ and $v_y$ represent velocity along x and y axes. The tracker module 243 includes a dynamic predictive motion model 336 and a measurement model 338. The dynamic predictive motion model 336 is defined by:

$$d_n = \Phi d_{n-1} + w_n \qquad \text{(equation 2)}$$

In equation 2, $\Phi$ represents a state transition model that is applied to the previous state $d_{n-1}$ from the Kalman filter. The state transition model $\Phi$ may be determined based on a physical model of the object. $w_n$ is a term for deliberately introducing noise. The noise $w_n$ represents a degree of certainty of the historical object state $d_{n-1}$. The measurement model is defined by:

$$y_n = H d_n + v_n \qquad \text{(equation 3)}$$

In equation 3, $y_n$ represents the state measurement of the true state $d_n$. The state measurement $y_n$ is taken from the detected object data 308, which may include measured position and velocity vectors. $v_n$ is an assumed measurement or observation noise. The Kalman filter output is based on the predictive motion model 336 and the measurement model 338 and thus takes into account current state of the detected object, historical state of the detected object and an object motion model. The Kalman filter output is described, in one embodiment, by:

$$\hat{d}_n = \Phi \hat{d}_{n-1} + K_n(y_n - H_n \Phi \hat{d}_{n-1}) \qquad \text{(equation 4)}$$

In equation 4, K is the Kalman gain, which is dependent upon the covariance Q of the predictive motion model noise $w_n$. When the covariance Q is high, the uncertainty in the predictive motion model 336 is high, which means that a lower weight or bias is placed on the predictive motion model 336 in determining $\hat{d}_n$.

In embodiments, the tracker update module 245 determines tracker adaptation data 320 that adapts, based on the acceleration data 318, the covariance Q (which adapts the Kalman gain K), sets the historical object state 314 ($\hat{d}_{n-1}$) to the current frame of detected object data 308 and/or adapts the parameters of the state transition model $\Phi$. Accordingly, the tracker module biases in favor of more closely reflecting the current measured state of the object and reduces the weight of the predictive motion model 336 and the historical object state 314 as relative acceleration of the object increases. The acceleration data 318 will define when the acceleration detection module 241 does not detect relative acceleration (i.e. detects relative constant velocity), which will lead the tracker update module 245 to revert to the tracking algorithm that fully takes into account the predictive motion model 336, historical object state 314 and the measurement model 338. Adaptation of the covariance matrix Q or changing the state transition model $\Phi$ can be performed by multiplying the relative constant velocity set values by a scalar multiplier that is greater than 1, e.g. by a factor of 10 to 100.

In embodiments, the electronic control system 118, or some other automatic vehicle control application, is responsive to the estimated object data 312 from the tracker module 243 in order to determine actuator control commands 316 such as braking, steering and propulsion actuator commands. The estimated object data 312 will be determined based on a different tracking algorithm depending on whether the acceleration detection module 241 determines an acceleration event and/or a quantitative measure of acceleration during the acceleration event.

Figure 5:
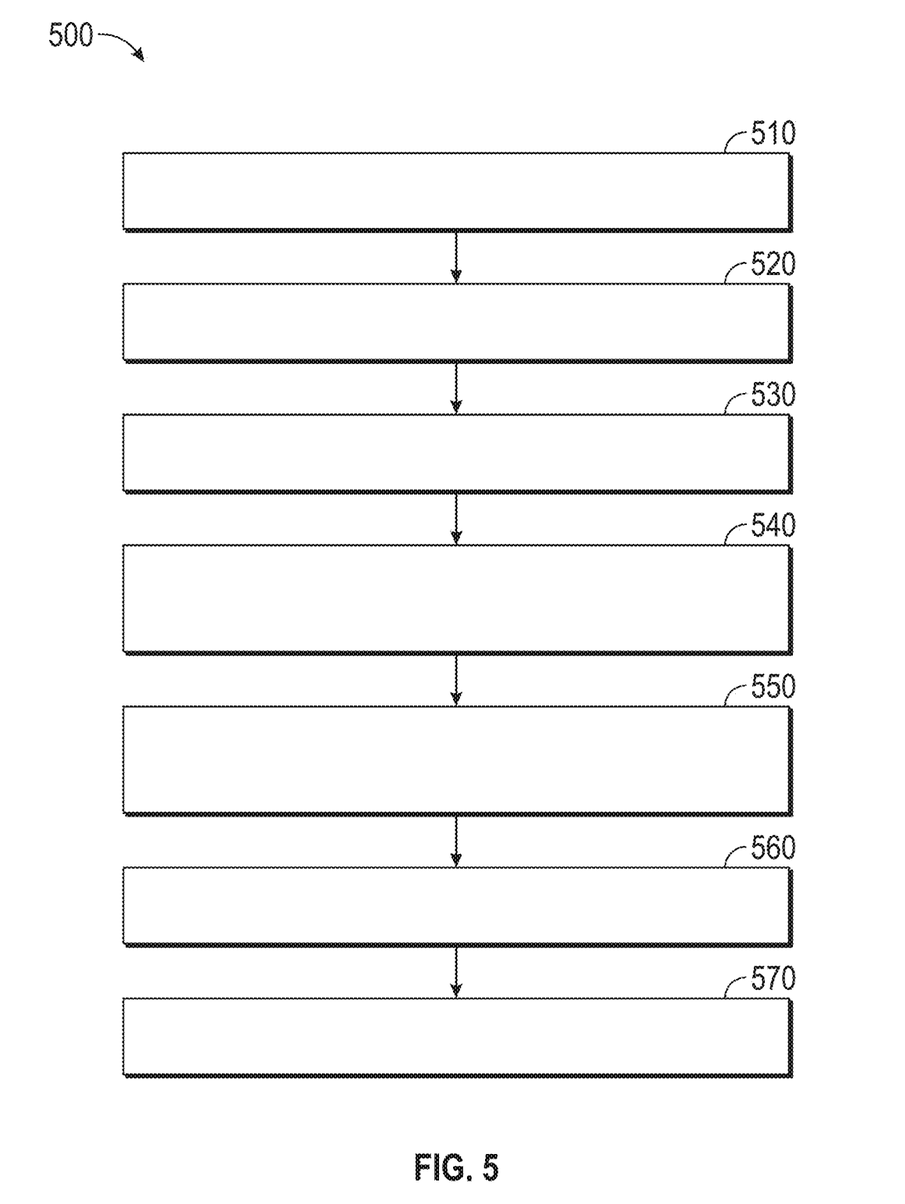
FIG. 5 is a flowchart of a method for implementing object tracking based on an adaptable tracking algorithm, which can be used in connection with the vehicle of FIG. 1 and the control system of FIG. 2, in accordance with an exemplary embodiment.

FIG. 5 is a flowchart of a method 500 for tracking an object using an acceleration adaptive tracking algorithm and for automatically controlling at least one vehicle function based on the tracked object. The method 500 can be implemented in connection with the vehicle 100 of FIG. 1 and the control system 102 of FIG. 2, in accordance with an exemplary embodiment. The method 500 may be implemented continuously during vehicle operation or intermittently in response to detection of certain vehicle conditions such as a threshold acceleration being breached.

As depicted in FIG. 5, the method includes the step 510 of receiving the RD map 304 from the radar system 202. The RD map 304 may have varying degrees of recognizable blurriness. In step 520, the acceleration of the object is detected based on the RD map 304, specifically based on a measure of the blurriness. In step 520, a binary output of acceleration is detected, a multiple level of acceleration is detected or a continuous detection is performed. The detection of acceleration based on the RD map 304 may be performed by the DNN 340.

In step 530, a current frame of detected object data 308 is received from the radar system or from the additional sensors 104 such as the cameras 210 or the lidar system 212. The current frame of detected object data 308 represents a measure of a current state of the one or more objects seen by the sensor. The object described in the detected object data 308 is tracked in step 540. In particular, the tracking algorithm takes into account the predictive motion model 336, which predicts a future state of the object based on a physical model. The tracking algorithm further takes into account a historical state of the object and the current state of the object. The state of the object includes position and velocity data. The tracking algorithm is able to take into account more or less historical state data and more or less bias to the predictive motion model 336. According to step 550, the tracking algorithm is adapted when acceleration is detected in step 520 so as to reduce the influence of the predictive motion model 336 and/or reduce the time steps or exclude the presence of the historical object state 314 so that the influence of the measurement model 338 and the current object state is increased. As such, the tracking algorithm is adapted in step 550 depending upon the outcome of the object acceleration detection step 520.

In step 560, the object is tracked using the adapted tracking algorithm. The object may be tracked using the un-adapted tracking algorithm when the acceleration detection ceases. In step 570, one or more vehicle actuators are controlled based on the tracked object, which is described in the estimated object data 312, e.g. so as to avoid collision with the tracked object. In one embodiment, steering, braking and/or propulsion commands are controlled based on the estimated object data 312.

It will be appreciated that the disclosed methods, systems, and vehicles may vary from those depicted in the Figures and described herein. For example, the vehicle 100 and the control system 102 and/or various components thereof may vary from that depicted in FIGS. 1 and 2 and described in connection therewith. In addition, it will be appreciated that certain steps of the method 500 may vary from those depicted in FIG. 5 and/or described above in connection therewith. It will similarly be appreciated that certain steps of the method described above may occur simultaneously or in a different order than that depicted in FIG. 5.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof

What is claimed is:

1. A method of object tracking and vehicle control, the method comprising:
receiving, via at least one processor, at least one Radar-Doppler, RD, map from a radar sensing system of a vehicle;

detecting, via the at least one processor, relative acceleration of an object with respect to the vehicle based on the RD map and a neural network, and providing acceleration data based thereon, wherein the neural network is a deep neural network and comprises a convolutional neural network, fully connected layers and a logistic regression operation, wherein the deep neural network is trained to classify RD maps that have been captured when the vehicle is moving at a constant velocity and to classify RD maps that have been captured when the vehicle is accelerating;

receiving, via the at least one processor, a current frame of detected object data from a sensing system of the vehicle;

when the relative acceleration has not been detected, tracking, via the at least one processor, the object based on the current frame of detected object data, a predictive motion model and a historical state of the object using a tracking algorithm and providing estimated object data based on the object tracking;

when the relative acceleration has been detected, adapting, via the at least one processor, the tracking algorithm to reduce the influence of at least one of the predictive motion model and the historical state of the object and tracking the object using the adapted tracking algorithm and providing adapted estimated object data based on the object tracking; and controlling, via the at least one processor, at least one vehicle feature based on the adapted estimated object data or the estimated object data.

2. The method of claim 1, wherein the acceleration data comprises:
a binary value indicating an accelerating state and a non-accelerating state;
a plurality of output levels corresponding to different states of acceleration; or
a continuously variable output representing degree of acceleration.

3. The method of claim 1, wherein the acceleration data is determined based on a detection of blurriness of the RD map.

4. The method of claim 1, wherein receiving a current frame of detected object data from a sensing system of the vehicle comprises receiving the current frame of detected object data from the radar system.

5. The method of claim 1, wherein receiving a current frame of detected object data from a sensing system of the vehicle comprises receiving the current frame of detected object data from a lidar system or a camera vision system.

6. The method of claim 1, wherein the tracking algorithm comprises a Kalman filter.

7. The method of claim 1, wherein adapting the tracking algorithm comprises at least one of:
replacing the historical state of the object with the current frame of detected object data;
adjusting a covariance matrix; and
adjusting parameters of the predictive motion model.

8. The method of claim 1, wherein the at least one vehicle feature comprises at least one of a steering command, a braking command and a propulsion command.

9. A vehicle, comprising:
a radar sensing system;
one or more vehicle actuators comprising at least one of steering, braking and propulsion actuators; and
at least one processor in operable communication with the radar sensing system and the vehicle actuators, the at least one processor configured to execute program instructions, wherein the program instructions are configured to cause the at least one processor to:
receive at least one Radar-Doppler, RD, map from the radar sensing system of the vehicle;
detect relative acceleration of an object with respect to the vehicle based on the RD map and a neural network, and provide acceleration data based on the relative acceleration detecting, wherein the neural network is a deep neural network and comprises a convolutional neural network, fully connected layers and a logistic regression operation, wherein the deep neural network is trained to classify RD maps that have been captured when the vehicle is moving at a constant velocity and to classify RD maps that have been captured when the vehicle is accelerating;
receive a current frame of detected object data from a sensing system of the vehicle;
when the relative acceleration has not been detected, track the object based on the current frame of detected object data, a predictive motion model and a historical state of the object using a tracking algorithm and provide estimated object data based on the object tracking;
when the relative acceleration has been detected, adapt the tracking algorithm to reduce the influence of at least one of the predictive motion model and the historical state of the object and track the object using the adapted tracking algorithm and provide adapted estimated object data based on the object tracking; and
control the one or more vehicle actuators based on the adapted estimated object data or the estimated object data.

10. The vehicle of claim 9, wherein the acceleration data comprises:
a binary value indicating an accelerating state and a non-accelerating state;
a plurality of output levels corresponding to different states of acceleration; or
a continuously variable output representing degree of acceleration.

11. The vehicle of claim 9, wherein the acceleration data is determined based on a measure of blurriness of the RD map.

12. The vehicle of claim 9, wherein receiving a current frame of detected object data from a sensing system of the vehicle comprises receiving the current frame of detected object data from the radar system.

13. The vehicle of claim 9, wherein receiving a current frame of detected object data from a sensing system of the vehicle comprises receiving the current frame of detected object data from a lidar system or a camera vision system.

14. The vehicle of claim 9, wherein the tracking algorithm comprises a Kalman filter.

15. The vehicle of claim 9, wherein adapting the tracking algorithm comprises at least one of:
replacing the historical state of the object with the current frame of detected object data;
adjusting a covariance matrix; and
adjusting parameters of the predictive motion model.

16. The vehicle of claim 9, the detected object data is produced based on range-doppler, beam forming and reflection points detection processes on raw radar data from at least one radar device of the radar system and wherein the RD map is produced by the range-doppler process on the raw radar data.

* * * * *